United States Patent [19]

Geller

[11] 3,826,975

[45] July 30, 1974

[54] UNIVERSAL DROPOUT TESTER FOR MAGNETIC STORAGE MEDIA

[75] Inventor: Sidney B. Geller, Rockville, Md.

[73] Assignee: The United States of America as represeted by the Secretary of the Commerce, Washington, D.C.

[22] Filed: Aug. 29, 1973

[21] Appl. No.: 392,608

[52] U.S. Cl. .......... 324/34 TA

[51] Int. Cl. .......... G01r 33/00

[58] Field of Search .......... 324/34 TA; 340/174 ED, 340/174.1 B

[56] References Cited

UNITED STATES PATENTS

| | | | |
|---|---|---|---|
| 3,525,930 | 8/1970 | Hodge | 324/34 TA |
| 3,755,731 | 8/1973 | Young | 324/34 TA |

OTHER PUBLICATIONS

Wherry, Magnetic Tape Tester Finds the Dead Spots, Radio Electronics, Nov. 1962, pp. 52–54.

*Primary Examiner*—Stanley T. Krawczewicz

*Attorney, Agent, or Firm*—David Robbins; Alvin J. Englert

[57] ABSTRACT

A method and apparatus are disclosed for testing the dropout response of a magnetic recording medium by detecting and counting dropouts present on the recorded magnetic recording medium. A pulse (which may be on any one of a number of fundamental frequencies) is recorded on the magnetic storage medium. When the level of the reproduced tone is below a given amplitude level, a timing apparatus consisting of a linear ramp generator and comparator is activated. The comparator produces an output pulse each time the level of the signal produced by the linear ramp generator falls below a given amplitude level. The production of each output pulse reflects that the dropout has persisted for a reference time unit. The number of pulses produced during any given dropout is a measure of the duration of the entire dropout in reference time units. The total number of pulses produced by the comparator is stored in a counter, the count reflecting the dropout performance of the magnetic storage media.

16 Claims, 14 Drawing Figures

UNIVERSAL DROPOUT TESTER FOR MAGNETIC STORAGE MEDIA

BACKGROUND OF THE INVENTION

1. Field of the Invention

The invention relates to a method and apparatus for detecting and counting dropouts on a recorded recording magnetic medium. More particularly, the invention relates to a method and apparatus wherein a pulse signal is recorded on a magnetic recording medium and the reproduced signal is analyzed by processing circuitry to determine if the magnetic recording medium meets federal standards promulgated to cover performance of magnetic recording mediums.

A dropout of a magnetically recorded signal may be defined as a momentary drop in the amplitude of the reproduced signal which was not present in the signal which was recorded. A dropout may consist of one or more of the signal pulses. Dropouts may be caused by any one of a number of possible defects in the magnetic recording medium, viz., scratches, craters, protrusions, creases, foreign objects on the tape surface such as dirt and dust, and removal or thinning of the layer of the magnetic recording material.

The United States Government, acting through the General Services Administration, has promulgated minimum performance specifications for computer, magnetic instrumentation and magnetic cassette tapes. In order to accurately determine if commercial recording mediums of the aforementioned type are in compliance with existing and future specifications governing magnetic recording media performance, it became necessary to develop a machine for detecting and counting the number of dropouts present on a recorded magnetic recording medium. The instant invention is a product of this development.

2. Description of the Prior Art

Cottin et al (U.S. Pat. No. 3,522,525) discloses an automatic magnetic tape dropout evaluator which uses a recorded tone for evaluating the performance of the magnetic tape medium. The reproduced tone is rectified, amplified and separated into filtered and unfiltered signals. An electrical comparator gates a linear sawtooth generator when the amplitudes of the filtered and unfiltered signals differ beyond a selectable limit. A second comparator generates an output signal when the linear sawtooth signal exceeds a threshold level, the occurrence of the output signal being an indication of a dropout of a given time duration. A counter stores the number of times that the linear sawtooth signal has exceeded the threshold level.

The Cottin apparatus differs from the instant invention in a number of fundamental aspects. For example, Cottin's apparatus for measuring the duration of a given dropout, namely, a gated linear sawtooth generator and associated comparator, is only capable of detecting if a given dropout has occurred for a period of greater time than a given reference time unit. The instant invention measures, in multiples of the given reference time unit, the period of time that a given dropout has persisted. To give an example, assume that a dropout of 180 microseconds is present on a tape whose dropout performance is being measured by the Cottin apparatus and the instant invention. Further, assume that both apparatus give an indication if a dropout has persisted for greater than 40 microseconds. In the case of the instant invention, an output is developed which indicates that the given dropout is between 160 and 200 microseconds in duration. On the other hand, the Cottin apparatus is capable of only indicating that the dropout is longer than 40 microseconds or some other given reference time unit. The Cottin apparatus measures the duration of a dropout as being only greater than the given reference time unit, not in multiples thereof. In addition, the instant invention, unlike the Cottin apparatus, has "free running" modes and a "controlled generator" mode for measuring dropout duration in multiples of the reference time unit. The "free running" modes of measuring the duration of a dropout occur when the reproduced level of the recorded signal is less than a predetermined percentage of the nominal level of the recorded signal without dropout. In this case the system operates under internal frequency control. The "controlled generator" mode of measuring the duration of a dropout also occurs when the reproduced level of the recorded signal is less than the predetermined percentage of the nominal level of the recorded signal without dropouts. In this case, the system operates under external frequency control. The advantage of having the "free running" and "controlled generator" modes is that the duration of the dropout or the number of individual dropouts may be accurately measured even if the reproduced level of the reproduced signals falls to zero.

Johnson (U.S. Pat. No. 3,536,994) discloses a dropout counter with continuous integration and moving counting period. The Johnson apparatus like the Cottin apparatus is only capable of measuring if a given dropout is greater in duration that a reference time unit. Accordingly, the Johnson apparatus does not measure the duration of a dropout in multiples of the reference time unit. Also, like the Cottin apparatus, the Johnson apparatus does not have "free running" and "controlled generator" modes for measuring dropout duration in multiples of the reference time unit. Also, neither the Cottin nor the Johnson apparatus is capable of performing the dropout measurements in the manners prescribed in the General Services Administration purchasing specification while the instant invention is so capable.

SUMMARY OF THE INVENTION

The disadvantages and limitations of the prior art are solved by the instant invention which provides a method and apparatus for detecting and counting dropouts present on a recorded magnetic storage medium.

The major parts of the invention may be summarized as follows. A pulse (which may be of any one of a number of fundamental frequencies) is recorded on a magnetic storage medium whose dropout performance is being tested. This pulse is detected by a magnetic head and coupled to a rectifying amplifier. The output from the rectifying amplifier is coupled to a comparator system which produces a control signal of a first amplitude level if the amplitude of the reproduced tone is more than a given amplitude and a control signal of a second amplitude level if the reproduced tone is less than the given amplitude. The control signals are applied to a gated linear ramp generator which is activated when the control signal is at the second amplitude level. The gated linear ramp generator has "free running" modes and a "controlled generator" mode. The "free running" modes occur when the level of the reproduced tone is below a predetermined percentage of the nominal level of the recorded signal without dropouts and when there are no frequency controlling pulses applied into the linear ramp generator. The "controlled generator" mode occurs when the level of the reproduced tone is below the predetermined percentage of the nominal level of the recorded signal without dropouts and when pulses which are derived from the recorded signal are used to control the linear ramp generator frequency. In the "free-running" modes, the linear ramp generator functions as a relaxation oscillator. In the "controlled generator" mode, the reproduced tone is inverted and amplified into a series of spikes or pulses which occur during the zero crossing point intervals of the reproduced signal. This series of spikes "keys" or triggers the linear ramp generator to oscillate at the fundamental frequency of the series of spikes. A comparator generates at output pulse each time the amplitude of the signal produced by the linear ramp generator exceeds a given threshold. Each output pulse indicates that the dropout has persisted for a reference time unit. If, after the first pulse output from the comparator, the dropout continues for one or more multiples of the reference time unit, an equal number of output pulses are produced. These pulses are coupled to a counter which has associated therewith suitable gating circuitry for steering the pulses to the counter under predetermined conditions.

BRIEF DESCRIPTION OF THE DRAWINGS

FIG. 4(*b*) shows the detailed circuit diagram of the variable gain amplifier shown in FIG. 1;

DETAILED DESCRIPTION OF THE SPECIFICATION

Figure 1:
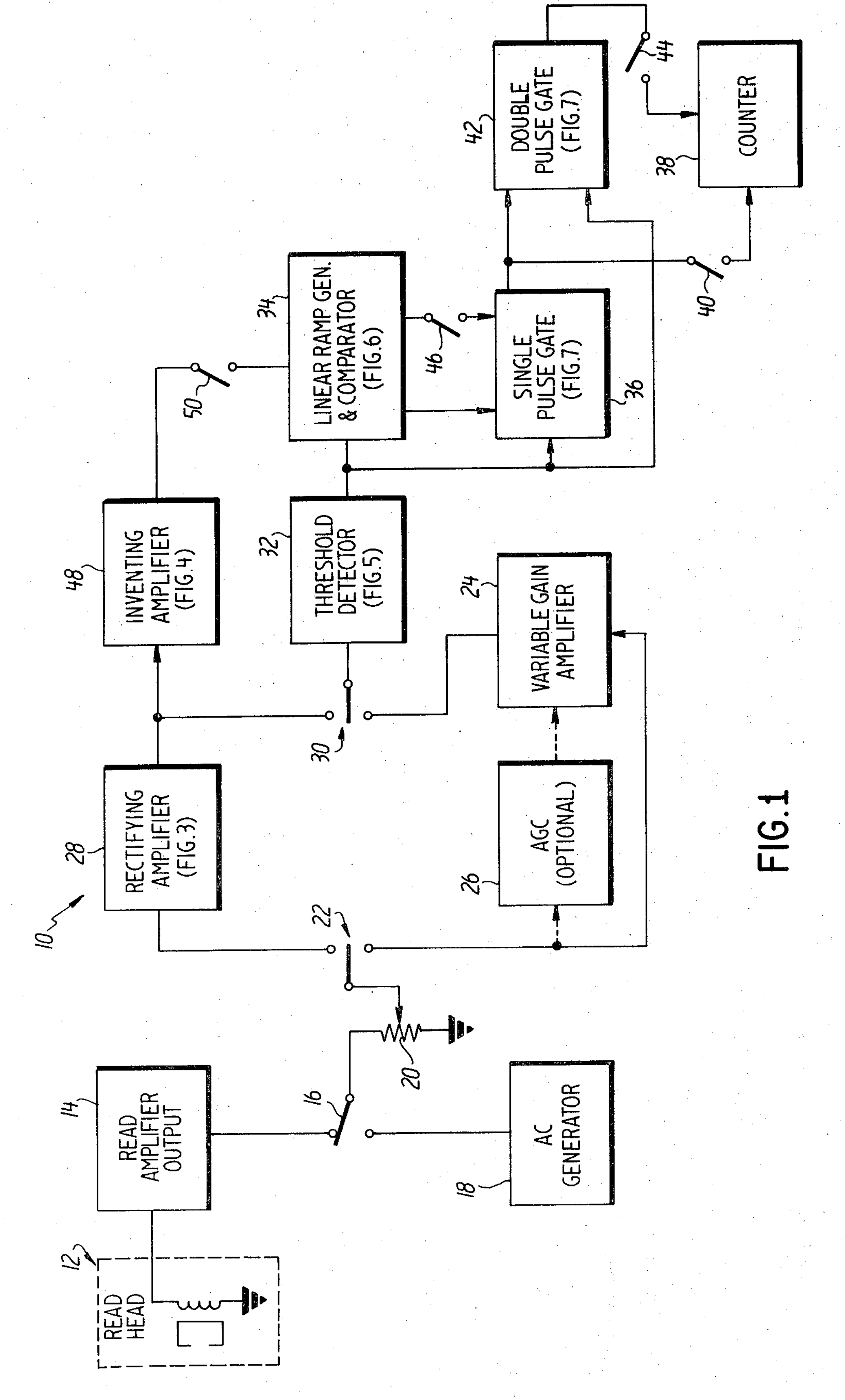
FIG. 1 shows a block diagram of the entire system.
Figures 2A, 2B, 2C, 2D, 2E, 2F, 2G:
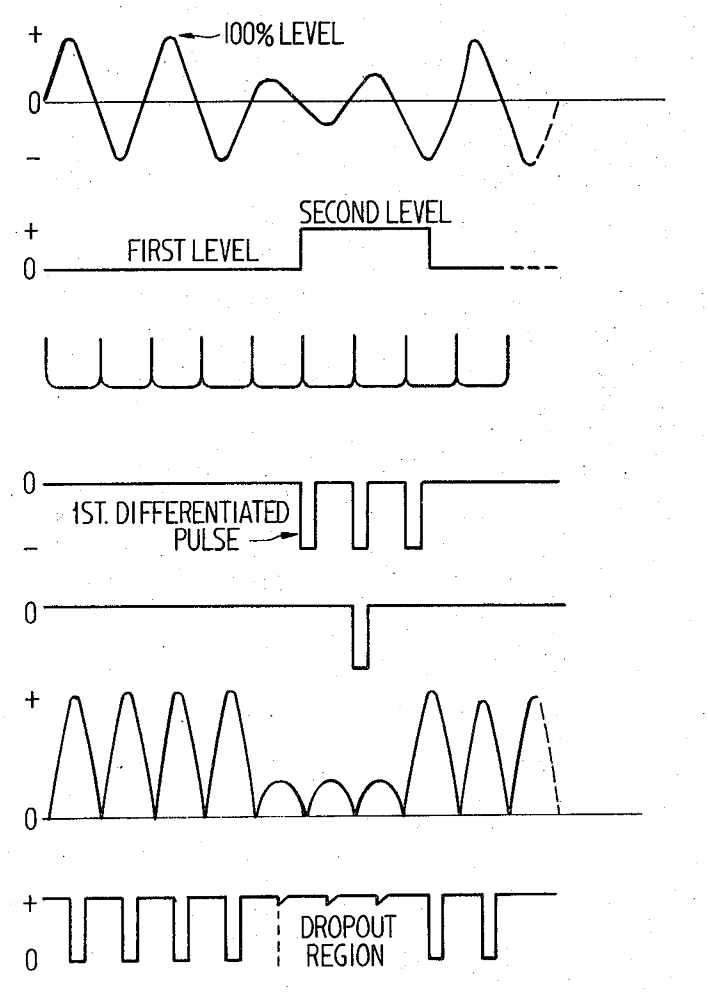
FIGS. 2(*a*) through 2(*g*) show oscillograms of waveforms produced by some of the major circuits comprising the block diagram in FIG. 1.

Referring to FIG. 1, numeral 10 designates a dropout detection and counting system constructed according to the instant invention. Read head 12 is coupled to a read amplifier 14 which amplifies the reproduced signal to a first level. While it is preferred that a constant frequency pulse signal be recorded on the magnetic recording medium being tested, other types of continuous time-varying signals may be used. The output of read amplifier 14 is coupled to the input of switch 16 which also has another input from alternating current generator 18. The output of switch 16 is coupled to ground via potentiometer 20. The wiper of potentiometer 20 is connected to the input of switch 22 which has two outputs. The first output of switch 22 is connected to a variable gain amplifier 24. Although it is not necessary, it may be desirable to add an automatic gain control stage 26 which controls the amplitude of the output signal produced by variable gain amplifier 24. The second output of switch 22 is connected to a rectifying amplifier 28. FIG. 2(a) shows a typical waveform appearing at the input of rectifying amplifier 28. The output signal produced by rectifying amplifier 28 consists of a plurality of unipolar pulses shown in FIG. 2(*f*). Preferably, they consist of a rectified sine wave. Connected between the output of the variable gain amplifier 24 and rectifying amplifier 28 is switch 30 having two inputs. The output of switch 30 is connected to a threshold detector 32 which functions to detect a drop in the reproduced signal level below a predetermined level. When the reproduced signal is below this predetermined level, the threshold detector 32 produces a rectangular wave whose duration is equal to the duration of the dropout detected by threshold detector 32. A typical output signal produced by threshold detector 32 is shown in FIG. 2(*b*). The output of threshold detector 32 is connected to a linear ramp generator and comparator 34. This circuit functions to produce a pulse for each reference time unit that the dropout persists. Accordingly, linear ramp generator and comparator 34 produces a plurality of pulses whose number is equal to the number of reference time units during which the dropout persists. Two outputs from linear ramp generator and comparator 34 are respectively connected to two inputs of single pulse gate 36. Single pulse gate 36 functions to steer the output pulses produced by linear ramp generator and comparator 34 to counter 38. A typical output signal produced by single pulse gate 36 is shown in FIG. 2(*d*). A suitable switch 40 is disposed between the output of single pulse gauge 36 and counter 38 so that the output of single pulse gate 36 may be selectively decoupled from counter 38. The output of single pulse gate 36 is also connected to a double pulse gate 42. Double pulse gate 42 functions to divide the number of output pulses produced by single pulse gate 36 by two. A typical output signal produced by double pulse gate 42 is shown in FIG. 2(*e*). The output of double pulse gate 42 is coupled to counter 38 via a suitable switch 44. Depending upon the mode of operation of the instant invention, either switch 40 or switch 44 will be closed to selectively coupled either the output from single pulse gate 36 or the output from double pulse gate 42 to counter 38. A switch 46 is connected between one of the outputs of linear ramp generator and comparator 34 and one of the inputs of single pulse gate 36. This switch is selectively opened depending upon the mode of operation. The input of inverting amplifier 48 is connected to the output of rectifying amplifier 28. A typical output signal from inverting amplifier 48 is shown in FIG. 2(*c*). Note the timing relationship between FIGS. 2(*c*), 2(*d*) and 2(*e*). Connected to the output of inverted amplifier 48 is a switch 50. Switch 50 may be selectively opened or closed depending upon whether the instant invention is operating in the "free-running" mode or in the "controlled generator" mode of linear ramp generator and comparator 34. These modes will be explained in detail in the remaining part of the specification.

Each of the major component circuits of the instant invention are shown in detail in FIGS. 3 through 7. A detailed description of each of these circuits follows hereinbelow.

Figure 3:
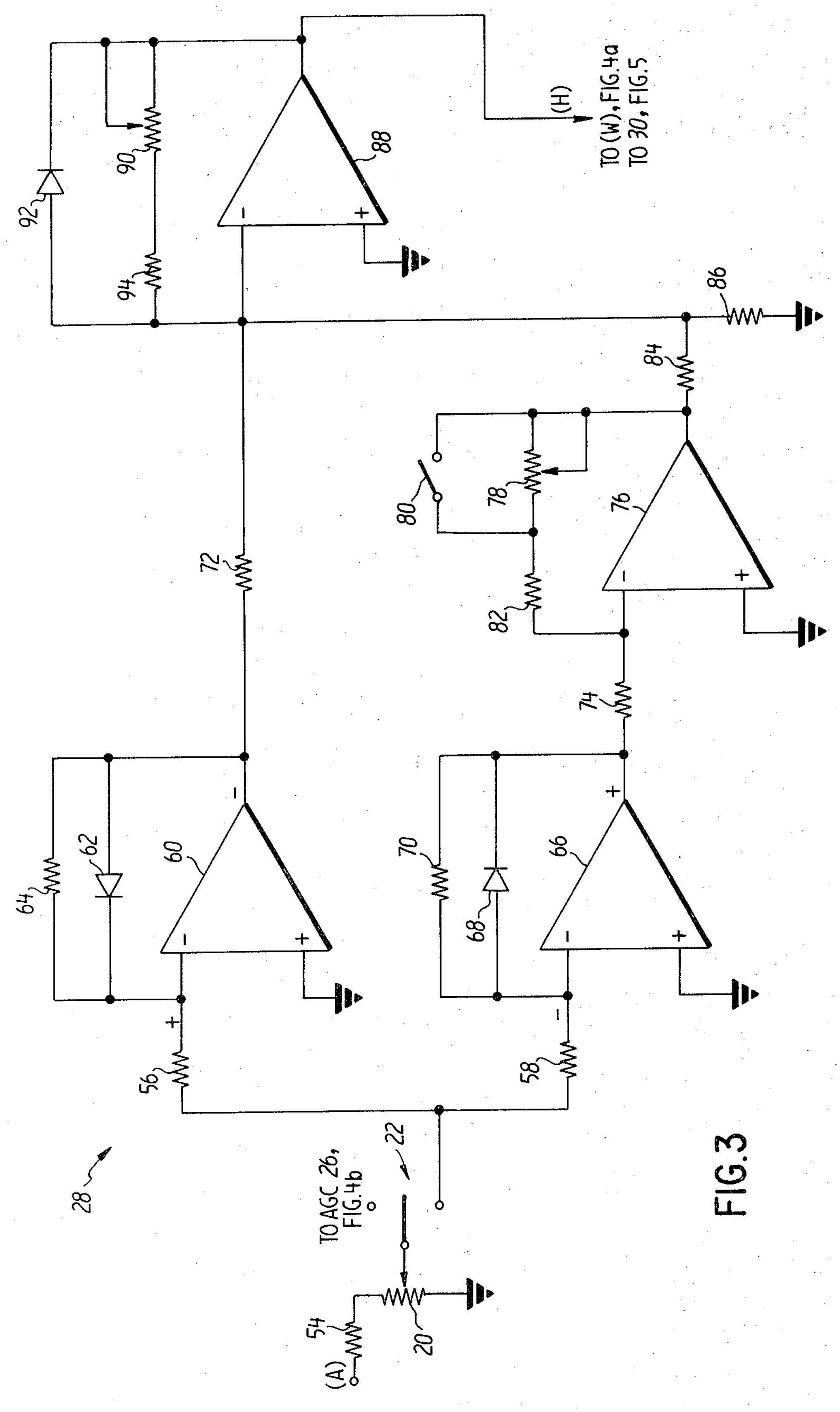
FIG. 3 shows the detailed circuit diagram of the rectifying amplifier shown in FIG. 1.

Referring to FIG. 3, numeral 28 generally designates the circuit diagram of the rectifying amplifier used in the instant invention. The output signal from read amplifier 14 (FIG. 1) is coupled to ground through the series combination of resistor 54 and potentiometer 20. The wiper of potentiometer 20 is coupled to the input of the rectifying amplifier 28 via switch 22. The rectifying amplifier 28 has two channels, the first channel having one amplification stage 60 therein and the second channel having two amplification stages 66 and 76 therein. The signals from these two channels are combined and amplifier by a fourth amplifier 88. All of these amplifiers are of the inverting type. The inputs of the two channels have resistors 56 and 58 disposed therein. In the first channel, operational amplifier 60 has a parallel feedback network comprised of diode 62 and resistor 64. Diode 62 prevents the amplification of negative polarity input signals. In the second channel, operational amplifier 66 has a parallel feedback network comprosed of diode 68 and resistor 70. Diode 68 prevents the amplification of positive polarity input signals by operational amplifier 66. The output of operational amplifier 60 is coupled to a junction point by means of a resistor 72. The output of operational amplifier 66 is coupled to a second operational amplifier 76 via resistor 74. The feedback network of operational amplifier 76 is comprised of potentiometer 78 in parallel with a switch 80, this parallel combination being in series with resistor 82. Switch 80 is normally in the open position as shown. The output of operational amplifier 76 is coupled to ground by means of resistors 84 and 86. Resistor 84 is also connected to the junction point of the two channels. The combined signals from the two channels are coupled to operational amplifier 68 which has a feedback network comprised of potentiometer 90 in series with resistor 94, these components being connected in parallel with diode 92. Diode 92 presents the amplification of positive polarity input signals.

The operation of the rectifying amplifier is as follows. The first channel, having operation amplifier 60 disposed therein, functions to amplify and invert positive signals to produce a negative polarity output. The two operational amplifiers 66 and 76 disposed in the second channel function to amplify negative polarity input signals and to produce a negative polarity output. Accordingly the input signal to operational amplifier 88 consists of a plurality of negative polarity pulses. Operational amplifier 88 inverts these negative polarity input pulses into a series of positive polarity output pulses as shown in FIG. 2(*f*).

Figure 4A:
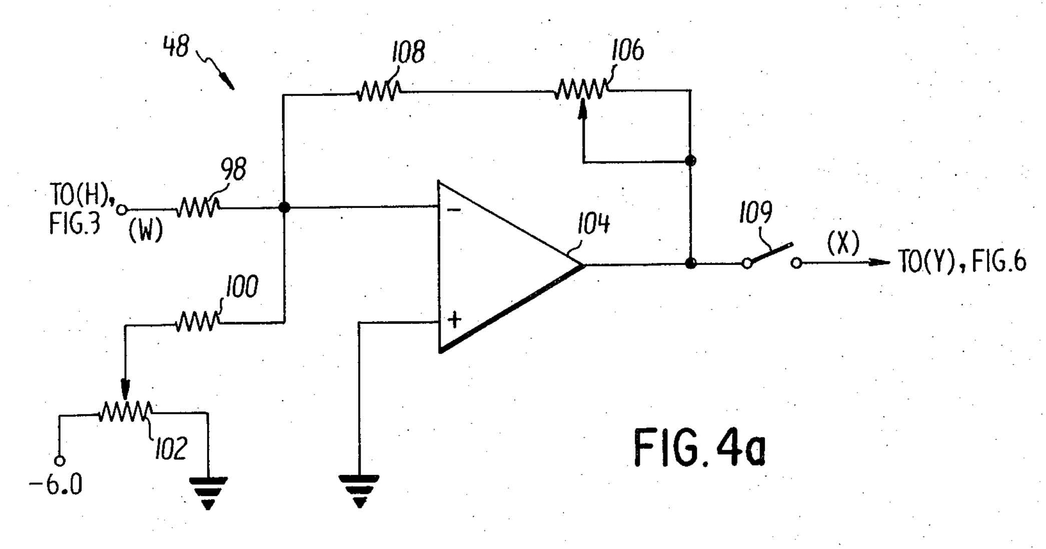
FIG. 4(*a*) shows the detailed circuit diagram of the inverting amplifier shown in FIG. 1.
Figure 4B:
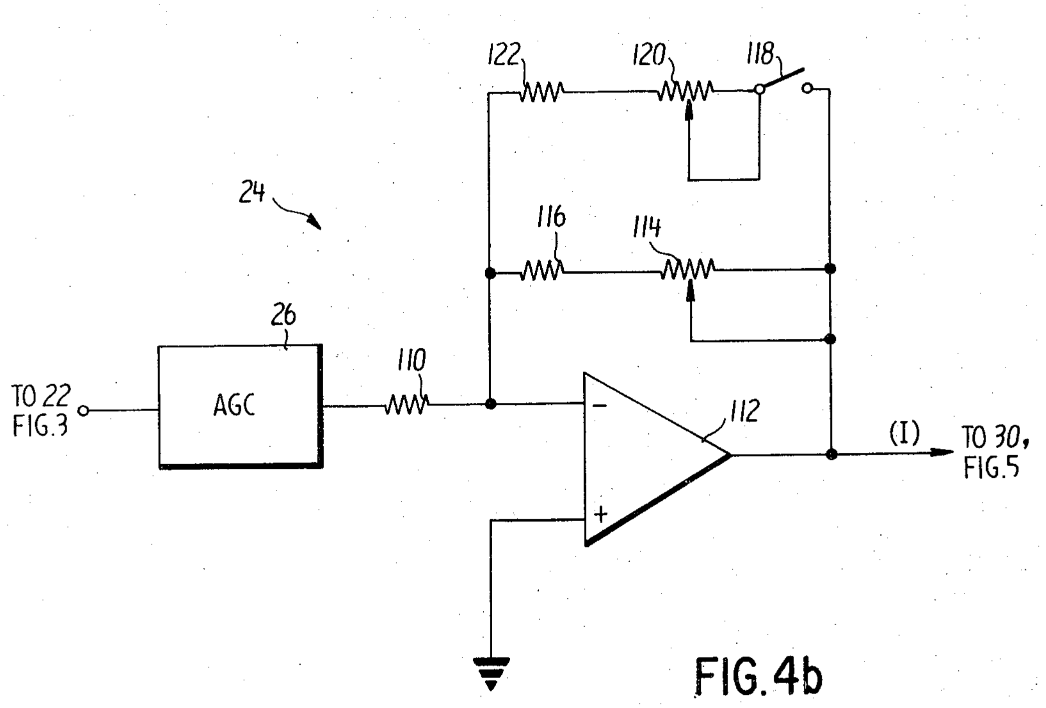

Referring to FIG. 4(*a*), numeral 48 generally designates the circuit diagram of the inverting amplifier used in the instant invention. The input to the inverting amplifier is coupled to the output of operational amplifier 88 as shown in FIG. 3. Resistor 98 and resistor 100 and potentiometer 102 comprise the input circuit for operational amplifier 104. The feedback network for operational amplifier 104 consists of potentiometer 106 in series with resistor 108. Switch 109 is provided in the output circuit of the amplifier. As a result of the rectification of the input signal by rectifying amplifier 28 and the relative gain produced by inverting operational amplifier 104, a series of sharp spikes or pulses are produced at the zero crossover points of the reproduced signal [FIG. 2(*a*) as shown in FIG. 2(*c*)].

Referring to FIG. 4(*b*), numeral 24 generally designates the detailed construction of the variable gain amplifier used in the instant invention. Automatic gain control network 26 is shown in block form as the details of this circuit are well known to those persons of ordinary skill in the art. While the automatic gain control circuit 26 has been shown to be in series with the input to operational amplifier 112, it is to be understood that the output of this circuit would actually be connected internally to the operational amplifier 112 to affect the gain of operational amplifier 30 by varying bias potential therein. Resistor 110 is connected in series with the input to operational amplifier 112 which has a first feedback network consisting of the series combination of potentiometer 114 and resistor 116 and a second feedback network consisting of the series combination of switch 118, resistor 120 and resistor 122, both of these feedback networks being in parallel with each other.

Figure 5:
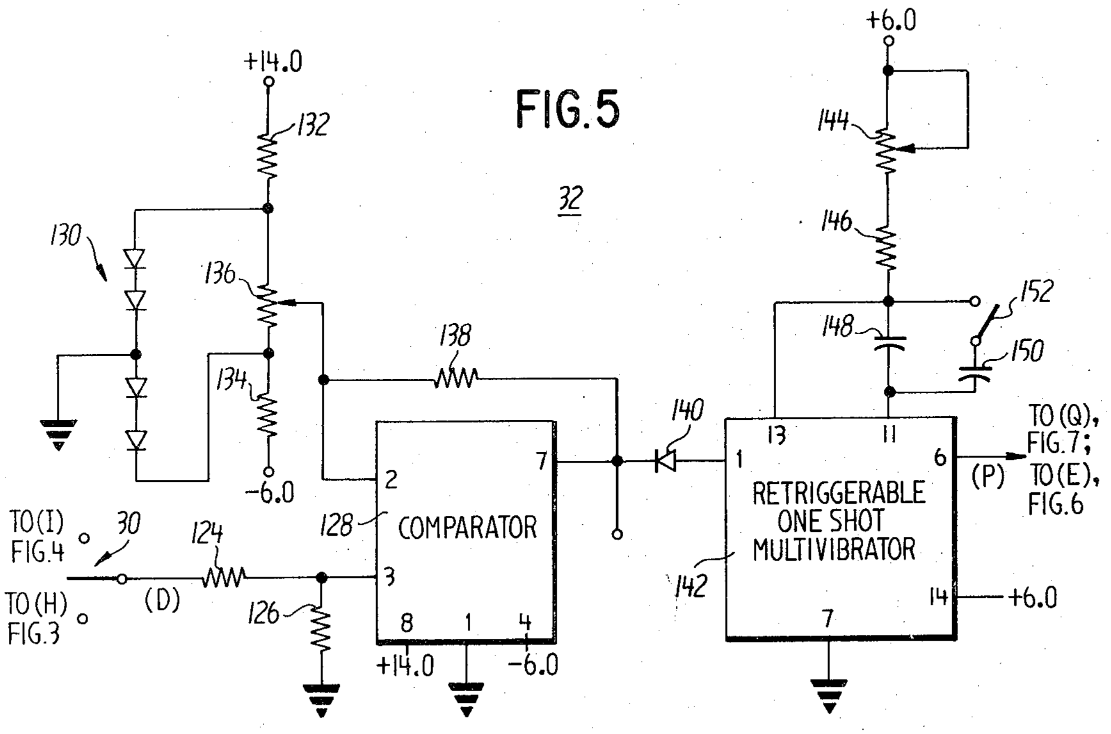
FIG. 5 shows the detailed circuit diagram of the threshold detector shown in FIG. 1.

Referring to FIG. 5, numeral 32 generally designates the circuit diagram of the threshold detector used in the instant invention. The input to the threshold detection circuit is from the output of switch 30 which is shown in FIG. 1. Coupled to the output of switch 30 is resistor 124 which is coupled to ground by means of resistor 126. The junction points of resistors 124 and 126 are coupled to the input of comparator 128. Comparators have been well known to those persons of ordinary skill in the art for many years, and therefore any number of well known comparator circuits could be used in the circuit shown in FIG. 5. However, the preferred type of comparator circuit is manufactured by Motorola Corporation and is identified by the part number MC1710CG. The input signal of comparator 128 is the rectified series of pulses produced by rectifying amplifier 28. Whenever the amplitude of any one or more of the reproduced pulses exceeds a threshold determined by adjustment of potentiometer 136, a signal is produced as shown in FIG. 2(*g*). The threshold adjustment network of comparator 128 consists of diodes 130, resistor 132, resistor 134, potentiometer 136 and resistor 138. The output of comparator 128 is coupled to a retriggerable one-shot multivibrator 142 by means of diode 140. This diode prevents the sampling of positive polarity pulses to the retriggerable one-shot multivibrator 142. Although any number of well-known retriggerable one-shot multivibrator circuits may be used, the preferred type of retriggerable one-shot multivibrator is manufactured by the Fairchild Corporation and is identified by the part number MC9601. The time constant of the retriggerable one-shot multivibrator 142 is determined by resistors 144, 146, capacitor 148, capacitor 150 and switch 152. Adjustment of the wiper arm of potentiometer 144 varies the duration of the astable state of multivibrator 142. The output of multivibrator 142 is shown in FIG. 2(b).

The threshold detector 32 of the instant invention operates as follows. As shown in FIG. 2(*g*), comparator 128 converts the unipolar series of pulses produced by rectifying amplifier 28 into a series of rectangular pulses whenever the amplitude of the unipolar pulses exceeds the threshold of comparator 128. The astable state of multivibrator 142 is adjusted to be equal in duration to the time between the successive pulses which are produced by comparator 128 when no dropout is present. This duration of the astable state of the retriggerable one-shot multivibrator 142 is produced by adjusting the wiper of potentiometer 144 to vary the RC time constant of the astable state of the retriggerable one-shot multivibrator 142. When the astable state of the retriggerable one-shot multivibrator 142 has been adjusted to be time coincident with the duration between successive pulses produced by comparator 128, the output signal produced by multivibrator 142 comprises a control signal of a first amplitude level when the reproduced signal is above a particular ampltidue level and a control signal of a second amplitude level when the reproduced recorded signal is below the particular amplitude level. When the control signal is at the second amplitude level, it activates the linear ramp generator shown in FIG. 6 as will be explained in detail hereinafter.

Figure 6:
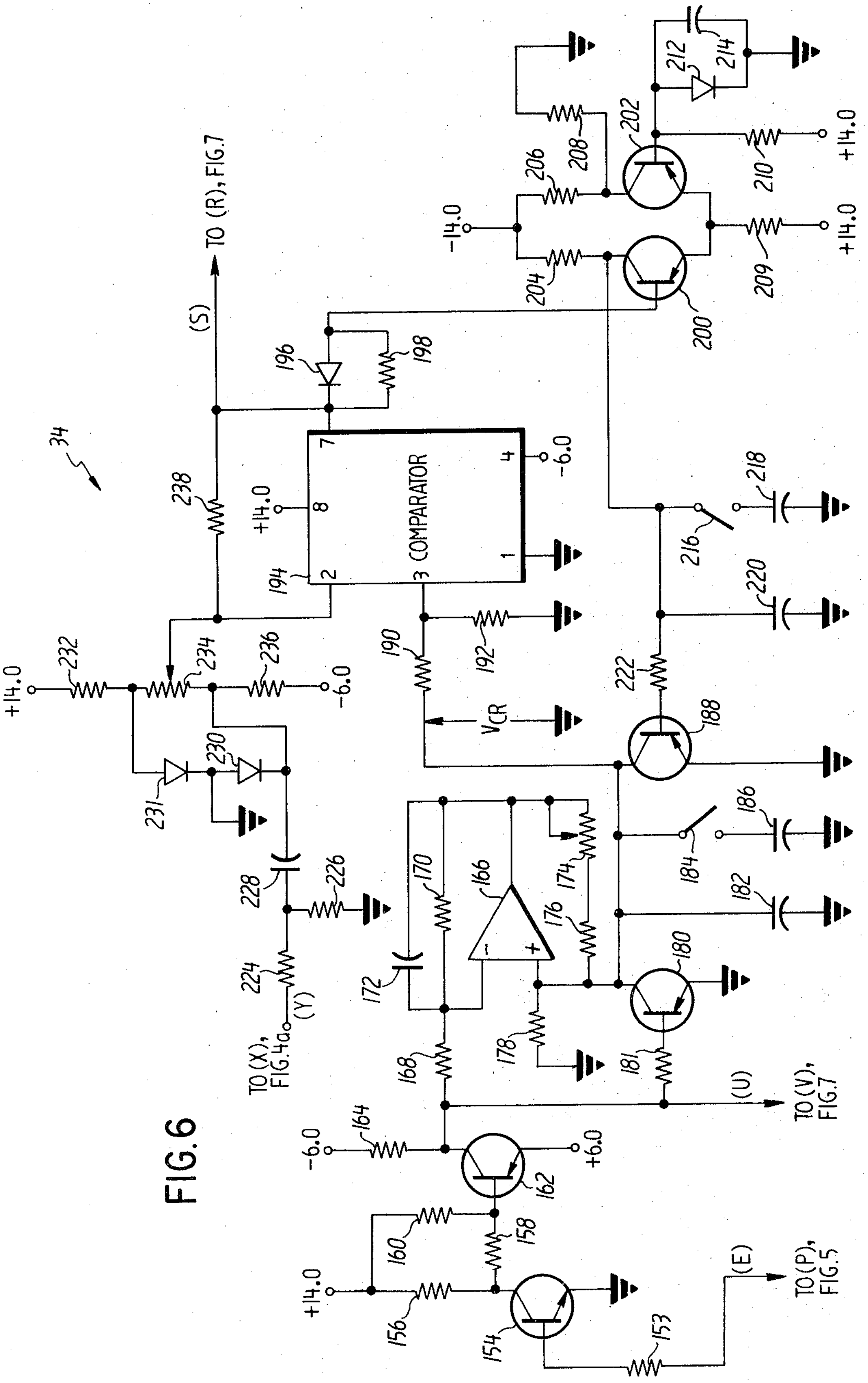
FIG. 6 shows the detailed circuit diagram of the linear ramp generator and comparator shown in FIG. 1.

Referring to FIG. 6, numeral 34 generally designates the circuit diagram of linear ramp generator and comparator used in the instant invention. The input to linear ramp generator and comparator 34 is from the output of threshold detector 32. Resistor 153 is connected in series with the base of transistor 154. Resistor 156 is coupled between a point of positive reference potential and the collector of transistor of 154. The series combination of resistors 158 and 160 is connected in parallel with resistor 160. The junction point between resistors 158 and 160 is connected to the base of transistor 162 whose emitter is coupled to a point of positive reference potential. Resistor 164 is connected between a point of negative reference potential and the collector of transistor 162. Operational amplifier 166 is coupled to the collector of transistor 162 via a resistor 168. Operational amplifier 166 has two feedback networks, the first consisting of the parallel combination of resistor 170 and capacitor 172, the second consisting of the series combination of potentiometer 174 and resistor 176. Resistor 178 is coupled between ground and the noninverting input of operational amplifier 166. The collector of transistor 180 is also connected to the noninverting input of operational amplifier 166. The base of transistor 180 is coupled to the collector of transistor 162 via resistor 181. The collector of transistor 180 is coupled to ground via capacitor 182 and the series combination switch 184 and capacitor 186. The collector of transistor 180 is also connected to the collector of transistor 188. The collector of transistor 188 is coupled to comparator 194 via resistors 190 and 192. While many types of well known comparator circuits may be used, it is preferred that the same type comparator circuit be used here as was used in comparator 128 shown in FIG. 5. The output of comparator 194 is coupled to transistor 200 via a parallel combination of diode 196 and resistor 198. Transistors 200 and 202 comprise a differential amplifier. The collectors of transistors 200 and 202 are coupled to a point of negative reference potential respectively via resistors 204 and 206. The collector of transistor 202 is coupled to ground via resistor 208. The emitters of transistor 200 and 202 are coupled to a point of positive reference potential via resistor 209. The base of transistor 202 is also coupled to a point of positive reference potential via a resistor 210. The base of transistor 202 is also coupled to ground via a parallel combination of diode 212 and capacitor 214. The collector of transistor 200 is coupled to ground via the series combination of switch 216 and capacitor 218 and capacitor 220. The collector of transistor 200 is also coupled to the base of transistor 188 via resistor 222. Referring to the top of FIG. 6, resistor 224 is connected to the output of inverting amplifier 48 and to ground via resistor 226. The junction point of resistors 224 and 226 is connected to capacitor 228. Capacitor 228 is coupled to ground via diode 230. The cathode of diode 231 is connected to the anode of diode 230 and to ground. The anode of diode 231 is coupled to a point of positive reference potential by means of resistor 232. The anode of diode 231 is also coupled to potentiometer 234 whose wiper arm is coupled to comparator 194. Potentiometer 234 is also coupled to a point of negative reference potential by means of resistor 236. The wiper arm of potentiometer 234 is coupled to the ouptut of comparator 194 by means of resistor 238.

The function of linear ramp generator and comparator circuit may be summarized as follows. When the output from threshold detector 32 rises to a positive potential, transistor 154 is driven into conduction. The drop in potential on the collector of transistor 143 drive transistor 162 into conduction. The corresponding rise in potential of the collector of transistor 162 turns off normally conducting transistor 180. The conduction of transistor 162 produces a positive going potential which is amplified by operational amplifier 166. The RC time constant of potentiometer 174, resistor 176 and capacitors 182 and 186 forms a linear ramp integration circuit in combination with operational amplifier 166. The slope of the ramp generated by the linear ramp generator is controlled by adjustment of potentiometer 174. The negative going ramp produced by the linear ramp generator is coupled to the input of comparator 194. Comparator 194 produces an output pulse when the magnitude of the linear ramp exceeds the threshold of the comparator which is adjusted by potentiometer 234. When the magnitude of the linear ramp signal exceeds the threshold value, a positive output voltage pulse is fed to the base of transistor 200. Normally conducting transistor 200 is turned off by this positive potential. The corresponding drop in the collector potential of transistor 200 causes transistor 188 to be driven into conduction, thereby discharging capacitors 182 and 186. If the positive potential from threshold detector 32 is still present at the base of transistor 154, operational amplifier 166 will again begin to build up a negative ramp in capacitors 182 and 186. This mode of operation continues until the potential at the base of transistor 154 is driven negative. Upon application of a negative potential to the base of transistor 154, transistor 180 is driven into conduction thereby preventing the charging of capacitors 182 and 186. This mode of operation is known as a "free-running" mode. It occurs when switch 50 (shown in FIG. 1) is opened and is used for signals for which a dropout is defined in terms of the length of time for which the signal has a value less than a reference threshold value. When switch 50 (shown in FIG. 1) is closed the dual "controlled generator" — "free running" mode of operation occurs. This mode is used for types of signals for which a dropout is defined in terms of each individual signal pulse or groups of pulses which fall below a reference threshold level. When switch 50 is closed then the spikes produced by the inverting amplifier 48 (shown in FIG. 2C) will appear on resistor 224 (FIG. 6). When the reproduced signals fall below the threshold level then the threshold detector 32 will rise to a positive potential. A linear ramp is now coupled into the input of comparator 194. At the instant that the pulse from the inverting amplifier 48 appears it overcomes the bias on comparator 194 and causes comparator 194 to produce a positive output pulse which is fed to the base of transistor 200. The normally conducting transistor 200 is turned off by this positive pulse. The corresponding drop in the collector potential of transistor 200 causes transistor 188 to be driven into conduction, thereby discharging capacitors 182 and 186. If the positive potential from threshold detector 32 is still present at the base of transistor 154, operational amplifier 166 will again begin to build up a linear ramp in capacitors 182 and 186. As long as a positive potential is applied to the base of transistor 154 during the controlled-generator mode (only during the presence of a dropout) the linear ramp generator will continue to oscillate at a frequency which is controlled by the repetition frequency of the spikes produced by inverting amplifier 48. These spikes are able to control the relaxation oscillator frequency until the reproduced signal level drops below 1 percent of its nominal value. At this time the linear ramp generator will revert to the "free-running" mode and remain in this mode until the reproduced signal level again rises above 1 percent of its nominal value. It then again reverts to the controlled generator mode. The importance of having the "free running" modes and the "controlled generator" mode of operation is that the instant invention is capable of detecting and measuring the duration or existence of dropouts which are characterized by a reproduced signal level from zero up to the maximum level which is considered to be a dropout as defined in terms of either time interval or individual pulses. The time for one complete signal cycle of the linear ramp generator during both the "free running" and "controlled generator" modes is defined as a reference time unit.

Figure 7:
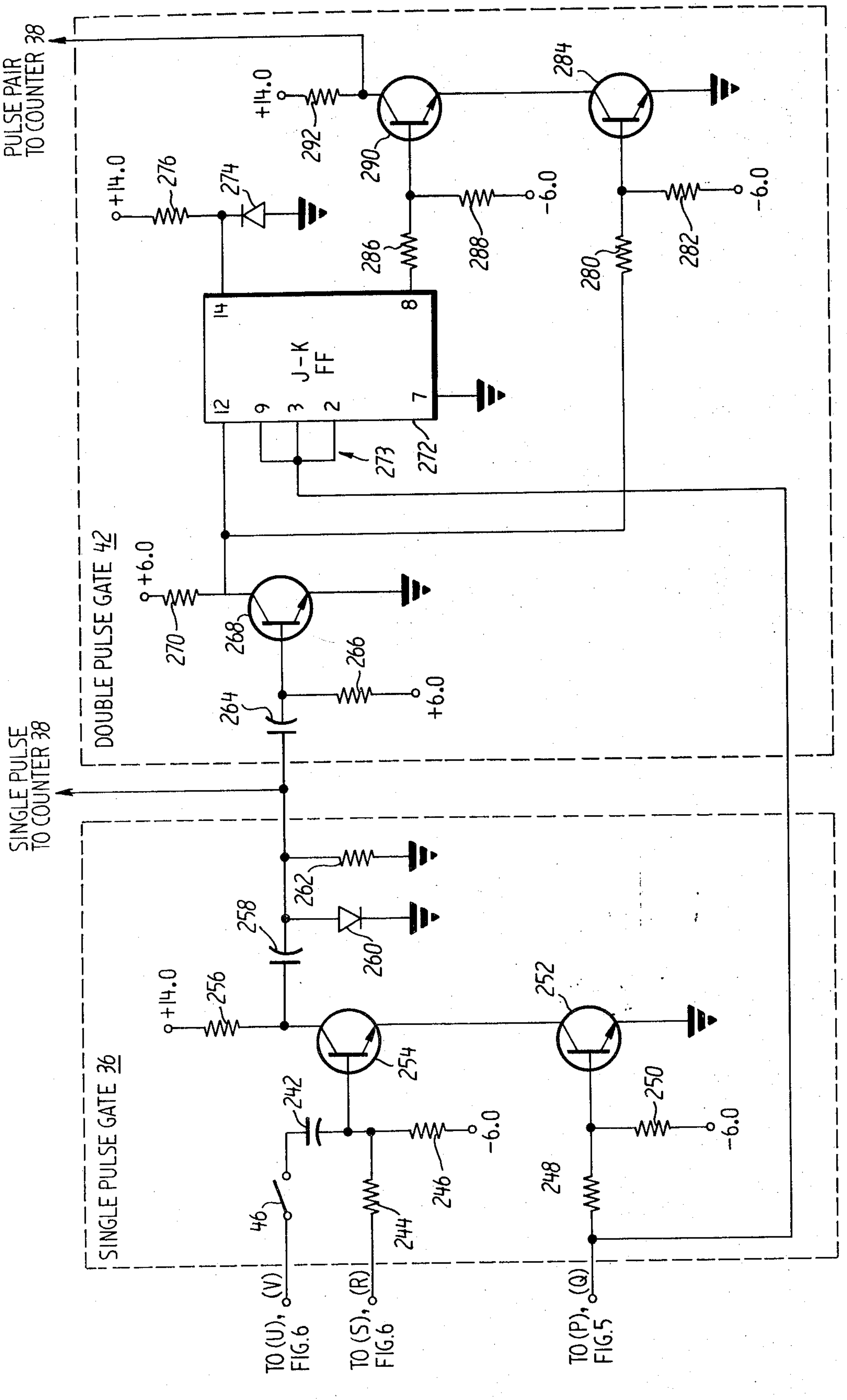
FIG. 7 shows the detailed circuit diagrams of the single pulse and double pulse gates shown in FIG. 1.

Referring to FIG. 7, numeral 36 generally designates the circuit diagram of the single pulse gate used in the instant invention. This circuit is surrounded by dotted lines for the sake of illustration. Single pulse gate 36 is coupled to counter 38 by closing switch 40 and opening switch 44. Switch 46 is coupled to the collector of transistor 162 as shown in FIG. 6. Connected in series with switch 46 is capacitor 242. Resistor 244 is connected to the output of comparator 194 as shown in FIG. 6. Resistor 244 is coupled to a point of negative reference potential by means of resistor 246. Resistor 248 is coupled to threshold detector 32 as shown in FIG. 5. Resistor 248 is coupled to a point of negative reference potential by means of resistor 250. The series combination of the transistors 252 and 254 are coupled between ground and a point of positive reference potential by means of resistor 256. Transistors 252 and 254 function as an "And" gate. The collector of transistor 254 is driven towards ground only during the application of positive potential to the bases of transistors 252 and 254. Depending upon the mode of operation, switch 46 may be either open or closed. Activation of transistors 252 and transistor 254 is an indication that a dropout has occurred which exceeds the reference time unti which is necessary for the negative ramp produced by the linear ramp generator to exceed the threshold level of comparator 194. During the occurrence of a dropout which is at least as long as one reference time unit, a positive pulse is applied to the base of transistor 252 as shown in FIG. 2(*b*). Each time the threshold level of comparator 194 is exceeded by the linear ramp generator, a positive pulse is applied to the base of transistor 254. During the time of coincidence of these two pulses, transistors 252 and 254 are activated to produce a negative going pulse train at the collector of transistor 254 as shown in FIG. 2(*d*). These negative pulses are coupled to ground by means of diode 260 and capacitor 258. The anode of diode 260 is coupled to ground by means of resistor 262. The anode of diode 260 is also coupled to a suitable counting circuit whose detailed construction forms no part of the instant invention. Accordingly, any well known counting circuit may be used. Each time one or more pulses are applied to the base of transistor 254 during the presence of a positive pulse on the base of transistor 252, a corresponding one or more pulses are coupled to counter 38. The number of pulses coupled to counter 38 during the occurrence of any one dropout is either a measure of the number of reference time units the dropout has persisted or a measure of the number of signal pulses which were less than the dropout threshold.

Numeral 42 generally designates the circuit diagram of the double pulse gate used in the instant invention. This circuit is surrounded by dotted lines for clarity of illustration. The function of the double pulse gate is to count every other pulse produced by comparator 194. The double pulse gate is coupled to counter 38 by opening switch 40 and closing switch 44. During this mode of operation, the total of counter 38 reflects that a dropout has persisted for twice the reference time unit necessary for the linear ramp generator to complete its signal cycle. The input to the double pulse gate 42 is coupled to the collector of transistor 254 by means of capacitor 258. The input to double pulse gate 42 is also coupled to a point of positive reference potential by means of the series combination of capacitor 264 and resistor 266. The junction between capacitor 264 and resistor 266 is coupled to the base of transistor 268. The collector of transistor 268 is coupled to a point of positive reference potential by means of resistor 270. The collector of transistor 268 is also connected to an input of a JK flip-flop of well-known construction. While many different types of JK flip-flops may be used, the preferred type is manufactured by the Texas Instrument Corporation and bears the identification number SN7472N. The toggle input of flip-flop 273 is coupled to the output of threshold detector 32. The connection of the collector of transistor 268 to the internal circuitry of JK flip-flop 272 is to both of the internal inputs of JK flip-flop 272, the toggle input functioning as a gate for these inputs when a positive potential is applied thereto. One of the outputs of JK flip-flop 272 is coupled to ground via zener diode 274. This output is also coupled to a point of positive reference potential by means of resistor 276. The collector of transistor 268 is coupled to the base of transistor 284 by means of resistor 280. Resistor 280 is coupled to a point of negative reference potential by means of resistor 282. The other output of JK flip-flop 272 is coupled to the base of transistor 290 by means of resistor 286. Resistor 286 is also coupled to a point of negative reference potential by means of resistor 288. The emitter of transistor 290 is connected in series with the collector of transistor 284, the collector of transistor 290 being coupled to a point of positive reference potential by means of resistor 292. Transistors 284 and 290 function as an "And" gate to couple every other pulse produced by the collector of transistor 254 with counter 38.

The overall operation of the dropout detection and counting system shown in FIG. 1 is as follows. The signal recorded on the magnetic recording media being tested is reproduced by read head 12 and amplified by read amplifier 14. This signal is rectified and amplified by rectifying amplifier 28 and coupled to threshold detector 32. The threshold detector 32 functions to produce a control signal of the first amplitude level when the reproduced signal is above a predetermined amplitude level and produces a control signal of a second amplitude level when the reproduced signal is below the predetermined amplitude level. When the control signal produced by threshold detector 32 is at the second amplitude level, the linear ramp generator is activated causing the build-up of a negative ramp. If a dropout persists for a reference time unit, the linear ramp signal will build up to the threshold of comparator 194 causing the production of an output pulse. As long as the dropout persists, a single pulse is produced by comparator 194 for each successive reference time unit. These pulses are coupled to counter 38 via either single pulse gate 36 or double pulse gate 42 depending upon the desired measurement results. When switch 50 is open, the linear ramp generator and comparator 34 is in a "free-running" mode. During this mode of operation, when a dropout persists, the linear ramp generator and comparator 34 oscillate at a frequency which is determined by the RC time constant within the linear ramp generator and comparator circuit 34. The oscillation frequency in this "free-running" mode is adjusted so that the spacing between the generator pulses is equal in time to the defined dropout reference time unit. As has been explained in the discussion of FIG. 6, the variation in the relaxation time of the linear ramp generator and comparator 34 is the free-running modes is accomplished by adjusting the wiper arm of potentiometer 174. When switch 50 is closed, the linear ramp generator and comparator 34 may operate in either the other "free-running" or "controlled-generator" modes. In this dual operating mode the oscillator frequency is adjusted to the fundamental frequency of the pulses produced by a rectifying amplifier 28. When the threshold detector 32 is at the second amplitude level the linear ramp generator and comparator 34 will generate pulses under the frequency control of the spikes from inverting amplifier 48. The controlled mode automatically changes to the other "free-running" mode when the amplitude of the pulsating signal produced by rectifying amplifier 28 falls below 1 percent of its nominal value and the pulses from the inverting amplifier 48 can no longer control the linear ramp generator and comparator 34 frequency. In this "free-running" mode which is associated with the dual operating mode, the operation is identical with the other "free-running" mode of operation which has been explained above, except that the oscillator frequency in this mode is adjusted to the fundamental frequency of the pulses produced by a rectifying amplifier 28. In the case of either the "controlled-generator" mode or the "free-running" generator modes, the control signal produced by threshold detector 32 must be at the second level in order to cause the linear ramp generator and comparator 34 to begin to produce negative ramps and output pulses from comparator 194. Depending upon whether it is desired to count every pulse or every other pulse produced by comparator 194, single pulse gate 36 or double pulse gate 42 is selectively coupled to counter 38 by respectively closing switch 40 and opening switch 44 or opening switch 40 and closing switch 44.

National Bureau of Standards Technical Note 739 is incorporated by a reference into this disclosure in its entirety. This publication is entitled "A Universal Dropout Tester for Magnetic Storage Media" and is authored by the inventor of the instant invention.

While the instant invention has been described in terms of a preferred embodiment, it should be apparent to those persons of ordinary skill in the art that numerous modifications may be made without departing from the spirit and scope of the invention.

It is therefore to be understood that within the scope of the appended claims, the invention may be practiced otherwise than as specifically described herein.

What is claimed as new and desired to be secured by letters Patent of the United States is:

1. In an apparatus for detecting dropouts present on a recorded magnetic medium, the combination comprising:

first means for reproducing the signal recorded on said magnetic tape;

second means coupled to said first means for producing a control signal of a first amplitude level when said reproduced signal is above a predetermined amplitude level and for producing a control signal of a second amplitude level when said reproduced signal is below said predetermined amplitude level;

signal generating means coupled to said second means, said signal generating means producing a signal having a cycle time equal to a reference time unit, the signal from said signal generating means not reaching a predetermined magnitude if the control signal of said second amplitude level produced by said second means persists for less than the reference time unit, the signal from said signal generating means reaching the predetermined magnitude once during every reference time unit that the control signal of said second amplitude level produced by said second means persists; and third means coupled to said signal generating means for producing an output signal of a first amplitude level each time said signal from said signal generating means is above the predetermined magnitude and for producing an output signal of a second amplitude level each time said signal from said signal generating means is below said predetermined magnitude.

2. In an apparatus for detecting dropouts as recited in claim 1 further comprising a fourth means coupled to said third means for counting the number of times the output signal produced by said fourth means is at said first amplitude level.

3. In an apparatus for detecting dropouts as recited in claim 2 further comprising:

fifth means coupled to said first means and to said signal generating means, said fifth means inverting and amplifying the signal reproduced by said first means to produce a pulse at each zero crossover point of the reproduced signal;

said fifth means "triggering" the cycle time of the signals produced by the signal generating means to the frequency of the pulses when the amplitude of said reproduced signal is greater than a predetermined percentage of the amplitude of the nominal level of the reproduced signal without dropouts, whereby said signal generating means operates in a "controlled generator" mode; and said fifth means not "triggering" the cycle time of the signals generated by said signal generating means to the frequency of the pulses when the amplitude of said reproduced signal is less than the predetermined percentage of the nominal level of the recorded signal without dropouts whereby said signal generating means operates in a "free-running" mode.

4. In an apparatus for detecting dropouts as recited in claim 3 wherein said pulse generating means comprises a linear ramp generator.

5. In an apparatus for detecting dropouts as recited in claim 4 wherein said first means comprises:

a readout magnetic head;

amplification means coupled to said readout magnetic head for amplifying the signal reproduced from said tape; and rectifying and amplifying means coupled to said amplification means for producing rectified, amplified pulses from said signal produced by said amplification means.

6. In an apparatus for detecting dropouts as recited in claim 5 further comprising a means for recording a pulse signal on said magnetic recording medium.

7. In an apparatus for detecting dropouts as recited in claim 6 further comprising:

a first "And" gate having first and second inputs and one output;

said first input being coupled to an output of said third means;

said second input being coupled to an output of said fifth means;

and a first switch having an input and an output, the input of said first switch being coupled to the output of said first "And" gate and the output of said first switch being coupled to said fourth means.

8. In an apparatus for detecting dropouts as recited in claim 7 further comprising:

a flip-flop having a first toggle input and a second input and an output, said first toggle input being coupled to an output of said second means, said second input being coupled to the output of said first "And" gate; and a second "And" gate having first and second inputs and one output, said first input being coupled to said output of said flip-flop, said second input being coupled to said output of said first "And" gate, a second switch having an input and an output, the input of said second switch being coupled to the output of said second "And" gate, the output of the second switch being coupled to said fourth means.

9. In an apparatus for detecting dropouts as recited in claim 6 wherein said second means comprises:

a comparator having an input and an output, said comparator producing an output signal of a first level when said reproduced signal is above a given level and producing an output signal of a second level when said reproduced signal is below a given level, the input of said comparator being coupled to said first means; and a retriggerable one-shot multivibrator coupled to the output of said comparator, said retriggerable one-shot multivibrator having an astable state of approximately the same duration as the time between successive pulses of the rectified amplifier signal produced by said first means.

10. In an apparatus for detecting dropouts as recited in claim 9 further comprising:

an alternating current signal generator of variable frequency;

a third switch having two inputs and an output, the first input of said third switch being coupled to said readout magnetic head and the second input being coupled to said alternating current generator;

a potentiometer having an input and an output, said input being coupled to the output of said third switch;

a fourth switch having an input and two outputs, the input of said fourth switch being coupled to the output of said potentiometer;

an amplifier having an input and an output, the first output of said fourth switch being coupled to said input of said amplifier, the second output of said fourth switch being coupled to said rectifying and amplifying means of said first means; and a fifth switch having two inputs and an output, a first input of said fifth switch being coupled to the output of said amplifier, the second input of said switch being coupled to said rectifying and amplifying means of said first means, the output of said fifth switch means coupled to the input of said comparator of said second means.

11. In an apparatus for detecting dropouts as recited in claim 10 further comprising an automatic gain control circuit having an input and an output, the input of said automatic gain control circuit being coupled to the first output of said fourth switch, the output of said automatic gain control circuit being coupled to a second input of said amplifier whose output is coupled to the first input of said fifth switch.

12. In an apparatus for detecting dropouts as recited in claim 10 further comprising:

a sixth switch having an input and an output, the input of said sixth switch being coupled to said fifth means, the output of said switch being coupled to said signal generating means; and a seventh switch having an input and an output, the input of said seventh switch being coupled to an output of said signal generating means, the output of said seventh switch being coupled to the first input of said first "And" gate.

13. A method for detecting and counting dropouts comprising the steps of:

recording a signal on a magnetic storage medium;

reproducing the recorded signal;

generating a control signal at a first amplitude level if the amplitude of the reproduced signal is of a greater magnitude than a predetermined amplitude;

generating a control signal at a second amplitude level if the amplitude of the reproduced signal is less than the predetermined amplitude;

timing the duration of the control signal at the second amplitude level to detect any duration longer than a reference time unit;

generating a pulse when the duration of the control signal at the second amplitude level is equal to the reference time unit, but not producing a pulse when the duration of the control signal of the second amplitude level is less than the reference time unit;

generating an additional pulse for each successive reference time unit that the control signal persists at the second amplitude level; and counting the number of pulses.

14. A method for detecting and counting dropouts as recited in claim 13 comprising the additional steps of:

rectifying the reproduced signal;

inverting the rectified signal;

amplifying the inverted signal to form a series of spikes at the zero crossover points of the inverted signal;

"triggering" the repetition frequency of the series of one or more pulses with the series of spikes when the amplitude of reproduced signals is greater than a predetermined percentage of the nominal level of the reproduced signal without dropouts; and generating pulses at the frequency of the series of spikes when the amplitude of the spikes fall below a predetermined percentage of the nominal level of the reproduced signal without dropouts, said pulses not being "triggered" by the series of spikes.

15. A method for detecting and counting dropouts as recited in claim 14 wherein the step of timing the duration of the control signal at the second amplitude level comprises the additional steps of:

activating a linear ramp generator to produce a linear ramp signal while the control signal is at the second level; and comparing the amplitude of the linear ramp signal with the amplitude of a reference signal.

16. A method for detecting and counting dropouts as recited in claim 13 wherein the steps of generating the control signal of the first and second amplitude levels comprise the steps of:

producing a pulse each time the reproduced signal is above a predetermined magnitude; and "triggering" the retriggerable monostable circuit with said pulses into an astable state with each pulse, the duration of each astable state being equal to the time between successive pulses, the control signal of the first amplitude level being produced by the retriggerable monostable circuit in its astable state when the reproduced signal's magnitude exceeds the predetermined level, the control signal of the second amplitude level being produced by the retriggerable monostable circuit in its stable state when the reproduced signal's magnitude is less than the predetermined level.

* * * * *